United States Patent
Pellmann

(10) Patent No.: US 11,361,894 B2
(45) Date of Patent: Jun. 14, 2022

(54) BI-STABLE SOLENOID WITH AN INTERMEDIATE CONDITION

(71) Applicant: HUSCO Automotive Holdings LLC, Waukesha, WI (US)

(72) Inventor: Matt Pellmann, Summit, WI (US)

(73) Assignee: HUSCO Automotive Holdings LLC, Waukesha, WI (US)

(*) Notice: Subject to any disclaimer, the term of this patent is extended or adjusted under 35 U.S.C. 154(b) by 294 days.

(21) Appl. No.: 16/352,005

(22) Filed: Mar. 13, 2019

(65) Prior Publication Data
US 2019/0287705 A1     Sep. 19, 2019

Related U.S. Application Data

(60) Provisional application No. 62/642,212, filed on Mar. 13, 2018.

(51) Int. Cl.
| | | |
|---|---|---|
| H01F 7/00 | (2006.01) | |
| H01F 7/122 | (2006.01) | |
| H01F 7/02 | (2006.01) | |
| H01F 7/16 | (2006.01) | |

(52) U.S. Cl.
CPC .......... H01F 7/122 (2013.01); H01F 7/0205 (2013.01); H01F 7/1615 (2013.01); *H01F 2007/1669* (2013.01); *H01F 2007/1692* (2013.01)

(58) Field of Classification Search
CPC ...... H01F 7/122; H01F 7/0205; H01F 7/1615; F01F 2007/1669; F01F 2007/1692
USPC ........................................................ 335/229
See application file for complete search history.

(56) References Cited

U.S. PATENT DOCUMENTS

| | | | | |
|---|---|---|---|---|
| 3,022,450 A | * | 2/1962 | Chase, Jr. ............. | H01F 7/1615 361/194 |
| 3,040,217 A | * | 6/1962 | Conrad .................. | H01F 7/1615 335/234 |
| 3,070,730 A | * | 12/1962 | Gray ...................... | H01F 7/1615 335/229 |

(Continued)

FOREIGN PATENT DOCUMENTS

| | | |
|---|---|---|
| CN | 201382195 Y | 1/2010 |
| CN | 102484398 A | 5/2012 |

(Continued)

OTHER PUBLICATIONS

European Patent Office, Extended European Search Report, Application No. 19275029.7, dated Jul. 18, 2019.

*Primary Examiner* — Shawki S Ismail
*Assistant Examiner* — Lisa N Homza
(74) *Attorney, Agent, or Firm* — Quarles & Brady LLP

(57) ABSTRACT

A bi-stable solenoid includes a housing, a wire coil, a permanent magnet, an armature, a pin, and a spring. The wire coil is arranged within the housing. The armature is slidably arranged within the housing and is moveable between a first armature position and a second armature position. The pin at least partially extends out of the housing and is slidably engaged by the armature. The spring is biased between the armature and the pin. When the pin encounters an intermediate position between a retracted position and an extended position due to the pin engaging an obstruction, the spring is configured to maintain a biasing force on the pin until the obstruction is removed.

20 Claims, 5 Drawing Sheets

(56) References Cited

U.S. PATENT DOCUMENTS

| | | | | |
|---|---|---|---|---|
| 3,178,151 A | * | 4/1965 | Caldwell | H01F 7/1615 251/129.1 |
| 3,202,886 A | * | 8/1965 | Kramer | H01F 7/1615 335/234 |
| 3,420,492 A | * | 1/1969 | Ray | F16K 31/082 251/68 |
| 3,460,081 A | * | 8/1969 | Tillman | H01F 7/1615 335/234 |
| 3,634,735 A | * | 1/1972 | Komatsu | H01F 7/1646 361/194 |
| 3,728,654 A | * | 4/1973 | Tada | H01F 7/1615 335/234 |
| 3,814,376 A | | 6/1974 | Reinicke | |
| 3,870,931 A | * | 3/1975 | Myers | H01F 7/1844 361/194 |
| 4,001,844 A | * | 1/1977 | McClintock | G03B 7/083 396/304 |
| 4,004,258 A | * | 1/1977 | Arnold | F16K 31/082 335/17 |
| 4,046,244 A | * | 9/1977 | Velazquez | B41J 2/285 400/124.17 |
| 4,072,918 A | | 2/1978 | Read, Jr. | |
| 4,243,899 A | * | 1/1981 | Jaffe | H02K 41/033 310/14 |
| 4,319,211 A | * | 3/1982 | Ueda | G03B 9/08 335/229 |
| 4,422,060 A | * | 12/1983 | Matsumoto | H01F 7/13 335/234 |
| 4,479,162 A | * | 10/1984 | Offutt | H01F 7/1607 335/255 |
| 4,486,728 A | * | 12/1984 | Hastings | H01F 7/1607 335/256 |
| 4,494,098 A | * | 1/1985 | Haneda | H01F 7/1615 335/230 |
| 4,533,890 A | * | 8/1985 | Patel | F01L 9/20 335/234 |
| 4,682,135 A | * | 7/1987 | Yamakawa | H01F 7/1638 335/230 |
| 4,690,371 A | * | 9/1987 | Bosley | F16K 31/082 251/129.01 |
| 4,751,487 A | * | 6/1988 | Green, Jr. | H01F 7/1615 335/230 |
| 4,829,947 A | * | 5/1989 | Lequesne | H01F 7/1615 123/90.11 |
| 4,845,392 A | * | 7/1989 | Mumbower | H01F 7/13 310/14 |
| 4,858,452 A | * | 8/1989 | Ibrahim | E05B 47/00 70/275 |
| 4,883,025 A | * | 11/1989 | Richeson, Jr. | F01L 1/16 123/90.11 |
| 4,928,028 A | * | 5/1990 | Leibovich | H01F 7/1646 310/23 |
| 4,994,776 A | * | 2/1991 | Juncu | H01F 7/1615 335/230 |
| 5,016,681 A | * | 5/1991 | Ghiardo | D03D 47/363 139/452 |
| 5,108,070 A | * | 4/1992 | Tominaga | H01F 7/13 251/65 |
| 5,149,996 A | * | 9/1992 | Preston | H01F 7/1615 310/12.02 |
| 5,166,652 A | * | 11/1992 | Koyama | D04B 15/78 335/234 |
| 5,300,908 A | * | 4/1994 | Stone | H01F 7/088 335/236 |
| 5,351,934 A | * | 10/1994 | Jensen | F16K 1/123 251/129.1 |
| 5,365,210 A | * | 11/1994 | Hines | H01F 7/1615 335/173 |
| 5,389,910 A | * | 2/1995 | Abel | H01F 7/1615 335/237 |
| 5,814,907 A | * | 9/1998 | Bandera | H01F 7/088 310/105 |
| 5,896,076 A | * | 4/1999 | van Namen | H01F 7/1615 335/229 |
| 5,903,203 A | * | 5/1999 | Elenbaas | H01H 51/28 335/179 |
| 6,040,752 A | * | 3/2000 | Fisher | H01F 7/1615 335/229 |
| 6,265,956 B1 | * | 7/2001 | Cascolan | H01F 7/1615 335/234 |
| 6,422,533 B1 | * | 7/2002 | Harms | F16K 31/0613 251/129.1 |
| 6,791,442 B1 | * | 9/2004 | Schmidt | H01F 7/1615 335/220 |
| 6,915,883 B2 | | 7/2005 | Watanabe et al. | |
| 8,228,149 B2 | * | 7/2012 | Puth | H01F 7/1615 335/229 |
| 8,555,735 B2 | | 10/2013 | Nawa et al. | |
| 8,710,945 B2 | * | 4/2014 | Wygnanski | H01F 7/1646 335/229 |
| 9,163,694 B2 | * | 10/2015 | Goldasz | F16F 9/464 |
| 9,478,339 B2 | * | 10/2016 | Gilmore | H01F 7/1615 |
| 9,562,574 B2 | | 2/2017 | Kimes | |
| 9,741,482 B2 | * | 8/2017 | Weisburgh | H01F 7/1615 |
| 9,899,132 B2 | | 2/2018 | Gilmore | |
| 10,297,376 B2 | * | 5/2019 | Church | H01F 7/1646 |
| 10,760,702 B2 | * | 9/2020 | Fuller | F16K 31/0651 |
| 10,792,799 B2 | * | 10/2020 | Binder | B25D 11/064 |
| 2004/0025949 A1 | * | 2/2004 | Wygnaski | F16K 31/082 137/624.18 |
| 2005/0052265 A1 | * | 3/2005 | Vladimirescu | H01H 51/2209 335/229 |
| 2007/0194872 A1 | * | 8/2007 | Pfister | H01H 3/222 335/229 |
| 2008/0006791 A1 | * | 1/2008 | Reinicke | H01F 7/1615 251/65 |
| 2008/0180200 A1 | * | 7/2008 | Gamble | H01F 7/081 335/234 |
| 2010/0183993 A1 | | 7/2010 | McAlister | |
| 2010/0300232 A1 | * | 12/2010 | Zanella | H01F 7/1615 74/473.12 |
| 2013/0328649 A1 | * | 12/2013 | Robertson | H01F 7/1615 335/234 |
| 2015/0061798 A1 | | 3/2015 | Seid et al. | |
| 2015/0062770 A1 | * | 3/2015 | Robertson | H01F 7/1615 361/147 |
| 2015/0332834 A1 | | 11/2015 | Schudt | |
| 2016/0169403 A1 | * | 6/2016 | Filippi | F16K 31/0675 239/585.1 |
| 2016/0327176 A1 | * | 11/2016 | Nemoto | F16K 31/0631 |
| 2017/0133138 A1 | * | 5/2017 | Bye | G01D 5/145 |
| 2019/0189322 A1 | * | 6/2019 | Wygnaski | A61M 16/202 |
| 2020/0087079 A1 | * | 3/2020 | Mecklenburg | H01F 7/1615 |

FOREIGN PATENT DOCUMENTS

| | | |
|---|---|---|
| CN | 202301976 U | 7/2012 |
| CN | 102782778 A | 11/2012 |
| CN | 102996543 A | 3/2013 |
| CN | 103325519 A | 9/2013 |
| CN | 105658951 A | 6/2016 |
| CN | 105895297 A | 8/2016 |
| CN | 105972294 A | 9/2016 |
| CN | 106847465 A | 6/2017 |
| DE | 202010010093 U1 | 9/2010 |
| DE | 102014117702 A1 | 6/2016 |
| DE | 102015121739 A1 | 6/2017 |
| GB | 1237706 A | 6/1971 |
| TW | 201443942 A | 11/2014 |

* cited by examiner

BI-STABLE SOLENOID WITH AN INTERMEDIATE CONDITION

CROSS-REFERENCES TO RELATED APPLICATIONS

The present application is based on, claims priority to, and incorporates herein by reference in its entirety U.S. Provisional Patent Application No. 62/642,212, filed on Mar. 13, 2018, and entitled "Bi-stable Solenoid with an Intermediate Condition."

STATEMENT REGARDING FEDERALLY SPONSORED RESEARCH

Not Applicable.

BACKGROUND

Bi-stable solenoids typically include a wire coil arranged around a moveable armature. When a current is applied to the wire coil, a magnetic field is generated that can then actuate (i.e., move) the moveable armature from a first position to a second position. In general, an armature within a bi-stable solenoid is moveable between two stable positions. For example, a current may be applied to the wire coil in a first direction with a magnitude sufficient to actuate an armature from a first position to a second position. The armature may remain in the second position until a current is applied to the wire coil in a second direction with a magnitude sufficient to actuate the armature from the second position back to the first position. Again, the armature may remain in the first position until the current is applied to the wire coil in the first direction with a sufficient magnitude.

SUMMARY OF THE INVENTION

The present disclosure provides a bi-stable solenoid that includes an internally disposed spring, which allows for the bi-stable solenoid to enter a tooth butt, or intermediate position where a pin can engage a tooth of a gear, and remain biased toward an extended position.

In one aspect, the present invention provides a bi-stable solenoid comprising a housing, a wire coil, a permanent magnet, an armature, a pin, and a spring. The wire coil and the permanent magnet are arranged within the housing. The armature is slidably arranged within the housing and is moveable between a first armature position and a second armature position. The pin at least partially extends out of the housing and is slidably engaged by the armature. The spring is biased between the armature and the pin. When the pin encounters an intermediate position between a retracted position and an extended position due to the pin engaging an obstruction, the spring is configured to maintain a biasing force on the pin until the obstruction is removed.

In another aspect, the present invention provides a bi-stable solenoid comprising a housing, a wire coil arranged within the housing, a permanent magnet arranged within the housing, and an armature slidably arranged within the housing and moveable between a first armature position and a second armature position. The bi-stable solenoid further includes a pin at least partially extending out of the housing and slidably engaged by the armature. The pin is moveable between an extended position and a retracted position. The bi-stable solenoid further includes a spring that is biased between the armature and the pin. When the armature is moved from the first armature position to the second armature position, the spring applies a force onto a pin, thereby biasing the pin toward the extended position, and when the armature is moved from the first armature position to the second armature position and the pin encounters an obstruction, the spring continues to bias the pin toward the extended position until the obstruction is removed and the pin is allowed to move to the extended position.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

Figure 1:
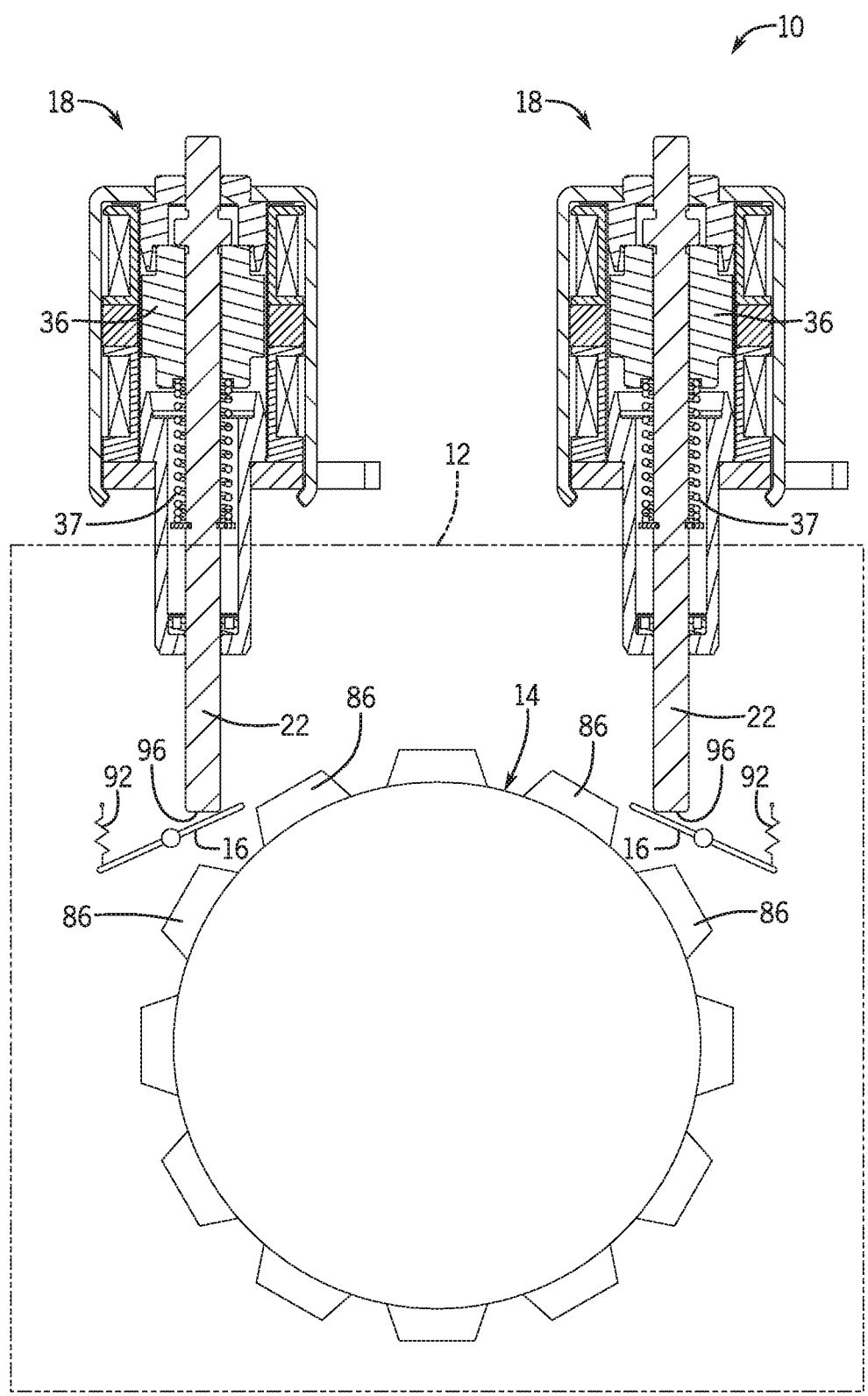
FIG. 1 is a schematic illustration of bi-stable solenoids configured to selectively actuate rockers to lock and unlock rotation of a gear according to one aspect of the present disclosure.

FIG. 1 shows a gear system 10 according to one aspect of the present disclosure. The gear system 10 can include a housing 12 enveloping a gear 14, one or more of rocker arms 16, and one or more bi-stable solenoids 18. In the illustrated non-limiting example, the gear system 10 includes a pair of rocker arms 16 and a corresponding pair of bi-stable solenoids 18 configured to actuate the rocker arms 16, as will be described. In some non-limiting examples, the gear system 10 may be arranged within a transmission on a vehicle. In other non-limiting examples, the gear system 10 may be arranged in an application requiring selective rotational control of a gear.

The gear 14 can be rotatably mounted within the housing 12. The pair of rocker arms 16 can be rotatably mounted within the housing 12. The rocker arms 16 can be configured to engage and disengage the gear 14 to selectively prevent or allow rotation of the gear 14 in either of the clockwise or counter-clockwise directions.

The pair of bi-stable solenoids 18 can each include a pin 22 configured to interact with a corresponding one of the rocker arms 16. The pins 22 can each be selectively moveable via energization of the corresponding bi-stable solenoid 18. Actuation of the pins 22 can correspondingly actuate the rocker arms 16 to selectively engage and disengage the gear 14.

Figure 2:
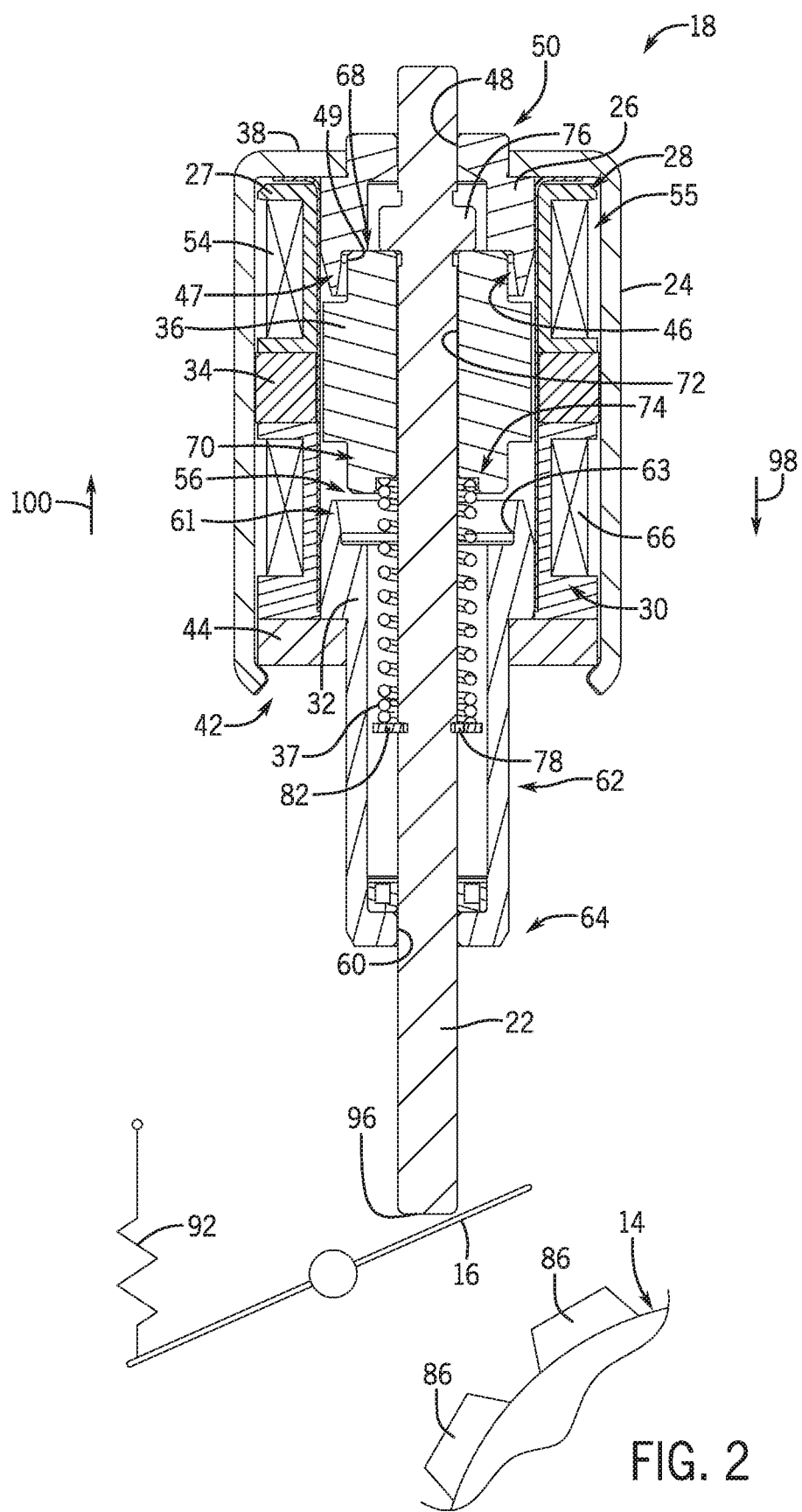
FIG. 2 is a schematic illustration of a bi-stable solenoid in an retracted position and allowing a rocker to move away from a gear according to one aspect of the present disclosure.

Referring now to FIG. 2, one of the bi-stables solenoids 18 is illustrated. It should be appreciated that the bi-stable solenoids 18 can be substantially identical. The bi-stable solenoid 18 can include a housing 24 at least partially enveloping a first pole piece 26, a bobbin 27, a second pole piece 32, a permanent magnet 34, an armature 36, and a spring 37. In some non-limiting examples, the housing 24 can define a generally hollow cylindrical shape and can include a first surface 38 and a generally open second end 42. The housing 24 can be coupled to a mounting flange 44 proximate the open second end 42. The mounting flange 44 can at least partially cover the open second end 42, thereby creating an enclosed chamber within the housing 24. The mounting flange 44 can be coupled to the housing 12, for example, to fix the bi-stable solenoid 18 relative to the gear 14.

The first pole piece 26 can be fabricated from a magnetic material (e.g., magnetic steel, iron, nickel, etc.). The first pole piece 26 can be disposed at least partially within the housing 24 and can extend at least partially through to the first surface 38. The first pole piece 26 can include a first armature-receiving portion 46 and a first pin-engaging aperture 48. The first armature-receiving portion 46 can be disposed at a first end 47 of the first pole piece 26, and can include a first armature-receiving recess 49 configured to receive the armature 36. The first pin-engaging aperture 48 can extend through a second end 50 of the first pole piece 26, and can be configured to slidably receive the pin 22 therethrough.

The bobbin 27 can define a first bobbin portion 28 that can be arranged adjacent to the first surface 38 of the housing 24. The first bobbin portion 28 can define a generally annular shape, and can surround at least a portion of the first pole piece 26. A first coil bay 54 of a wire coil 55 may be wound around the first bobbin portion 28. The second bobbin portion 30 can be arranged adjacent to the mounting flange 44 within the housing 24. The second bobbin portion 30 can define a generally annular shape, and can surround at least a portion of the second pole piece 32. A second coil bay 66 of the wire coil 55 may be wound around the second bobbin portion 30.

The second pole piece 32 can be fabricated from a magnetic material (e.g., magnetic steel, iron, nickel, etc.). The second pole piece 32 can be disposed partially within the housing 24 and spaced axially apart from the first pole piece 26. The second pole piece 32 can extend at least partially through and be coupled to the mounting flange 44. The second pole piece 32 can include a second armature-receiving portion 56, a second pin-engaging aperture 60, and a hollow cylindrical portion 62. The second armature-receiving portion 56 can be disposed at a first end 61 of the second pole piece 32, and can include a second armature-receiving recess 63 configured to receive the armature 36. The second pin-engaging aperture 60 can extend through a second end 64 of the second pole piece 32, and can be configured to slidably receive the pin 22 therethrough. The hollow cylindrical portion 62 can extend between the second armature-receiving portion 56 and the second end 64 of the second pole piece 32.

The permanent magnet 34 can define a generally annular shape and can be disposed within the housing 24 between the second bobbin portion 30 and the first bobbin portion 28. The annular shape of the permanent magnet 34 enables the armature 36 to extend therethrough.

The armature 36 can be fabricated from a magnetic material (e.g., magnetic steel, iron, nickel, etc.). The armature 36 can include a first portion 68, a second portion 70, and a central aperture 72. During operation, the first portion 68 can be configured to engage the first armature-receiving recess 49 of the first pole piece 26, and the second portion 70 can be configured to engage the second armature-receiving recess 63 of the second pole piece 32. The second portion 70 of the armature 36 can additionally include a spring-receiving recess 74 configured to engage the spring 37. The central aperture 72 can be configured to slidably receive the pin 22 therethrough, as will be described herein.

The pin 22 can slidably extend through the first pole piece 26, the armature 36, and the second pole piece 32. The pin 22 can slidably engage the second pin-engaging aperture 60 of the second pole piece 32, the central aperture 72 of the armature 36, and the first pin-engaging aperture 48 of the first pole piece 26. The pin 22 can include a shoulder 76 and a snap ring recess 78 arranged on opposing sides of the armature 36. The shoulder 76 can extend radially outward from the pin 22 and can be sized such that an outer diameter of the shoulder 76 is larger than the inner diameter of the central aperture 72. The snap ring recess 78 can receive a snap ring 82, which can snap into the snap ring recess 78, thereby fixing the snap ring 82 relative to the pin 22. The snap ring 82 can be sized such that an outer diameter of the snap ring 82 is larger than a diameter of the spring 37. The snap ring recess 78 can be axially separated from the shoulder 76, such that the armature 36 is arranged between the shoulder 76 and the snap ring 82.

Figure 5:
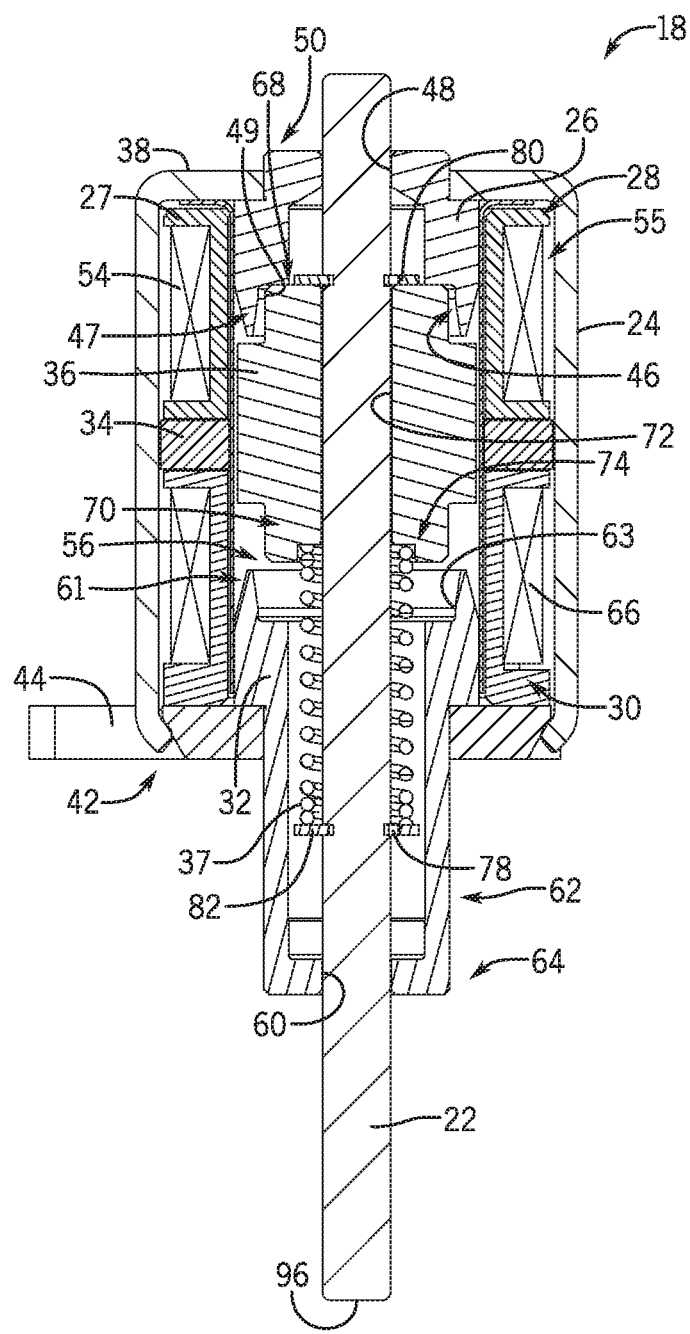
FIG. 5 is a schematic illustration of another bi-stable solenoid according to one aspect of the present disclosure.

In some non-limiting examples, the bi-stable solenoid 18 may include a second snap ring 80 coupled to the pin 22 on an axially opposing side of the armature 32 (see, e.g., FIG. 5) than the snap ring 82, rather than the shoulder 76. In some non-limiting examples, the bi-stable solenoid 18 may include another shoulder arranged on an axially opposing side of the armature 32 than shoulder 76, rather than the snap ring 82. In any case, the pin 22 is designed to include mechanical structures on axially opposing sides of the armature 32 to limit the axial displacement of the pin 22 and to provide a structure against which the spring 37 may bias the pin 22 relative to the armature 32.

The spring 37 can envelop a portion of the pin 22 between the snap ring 82 and the spring receiving recess 74 of the armature 36. The spring 37 can be biased between the spring receiving recess 74 and the first snap ring 82. When assembled, the spring 37 may bias the pin 22 in an axial direction away from the armature 36 (i.e., in an downward direction from the perspective of FIG. 2).

One non-limiting example of the operation of the bi-stable solenoid 18 within the gear system 10 will be described below with reference to FIGS. 1-4. It should be appreciated that the described operation of the bi-stable solenoid 18 can be adapted to any system that includes a suitable gear. In operation, the wire coil 55 of the bi-stable solenoid 18 may be selectively energized, i.e., supplied with a current in a desired direction at a predetermined magnitude. In response to the current being applied to the wire coil 55, the armature 36 can move between two stable positions depending on the direction of the current applied to the wire coil 55. In the illustrated non-limiting example, the armature 36 may be moveable between a first armature position (see, e.g., FIG. 2) where the armature 36 contacts the first armature-receiving recess 49 of the first pole piece 26 and a second armature position (see, e.g., FIG. 3) where the armature 36 contacts the second armature-receiving recess 63 of the second pole piece 32.

In some non-limiting examples, the armature 36 may be in the first armature position and the wire coil 55 of the bi-stable solenoid 18 may be energized with a current in a first direction. The armature 36 may then fully shift (i.e., actuate) to the second armature position and the wire coil 55 may be de-energized (i.e., the current is removed). The armature 36 will remain in the second armature position until the wire coil 55 is energized with a current in a second direction opposite to the first direction. The armature 36 may then fully shift back to the first armature position and the wire coil 55 may be de-energized. In this way, the operation of the bi-stable solenoid 18 may require a reduced energy input because the wire coil 55 is not required to be continuously energized.

Due to the interactions between the shoulder 76, the armature 36, the spring 37, and the snap ring 82, the movement of the armature 36 may influence a position of the pin 22. For example, during operation, the pin 22 may be moved between a retracted position (see, e.g., FIG. 2) and an extended position (see, e.g., FIG. 3), in response to movement of the armature 36 between the first armature position and the second armature position. In some instances, the pin 22 may encounter an intermediate position (see, e.g., FIG. 4) where the pin 22 is temporarily prevented from fully extending from the retracted position to the extended position due to an obstruction. As will be described, the design and properties of the bi-stable solenoid 18 enable the pin 22 to encounter the intermediate position and eventually reach the desired extended position without requiring energization of the wire coil 55.

Figure 3:
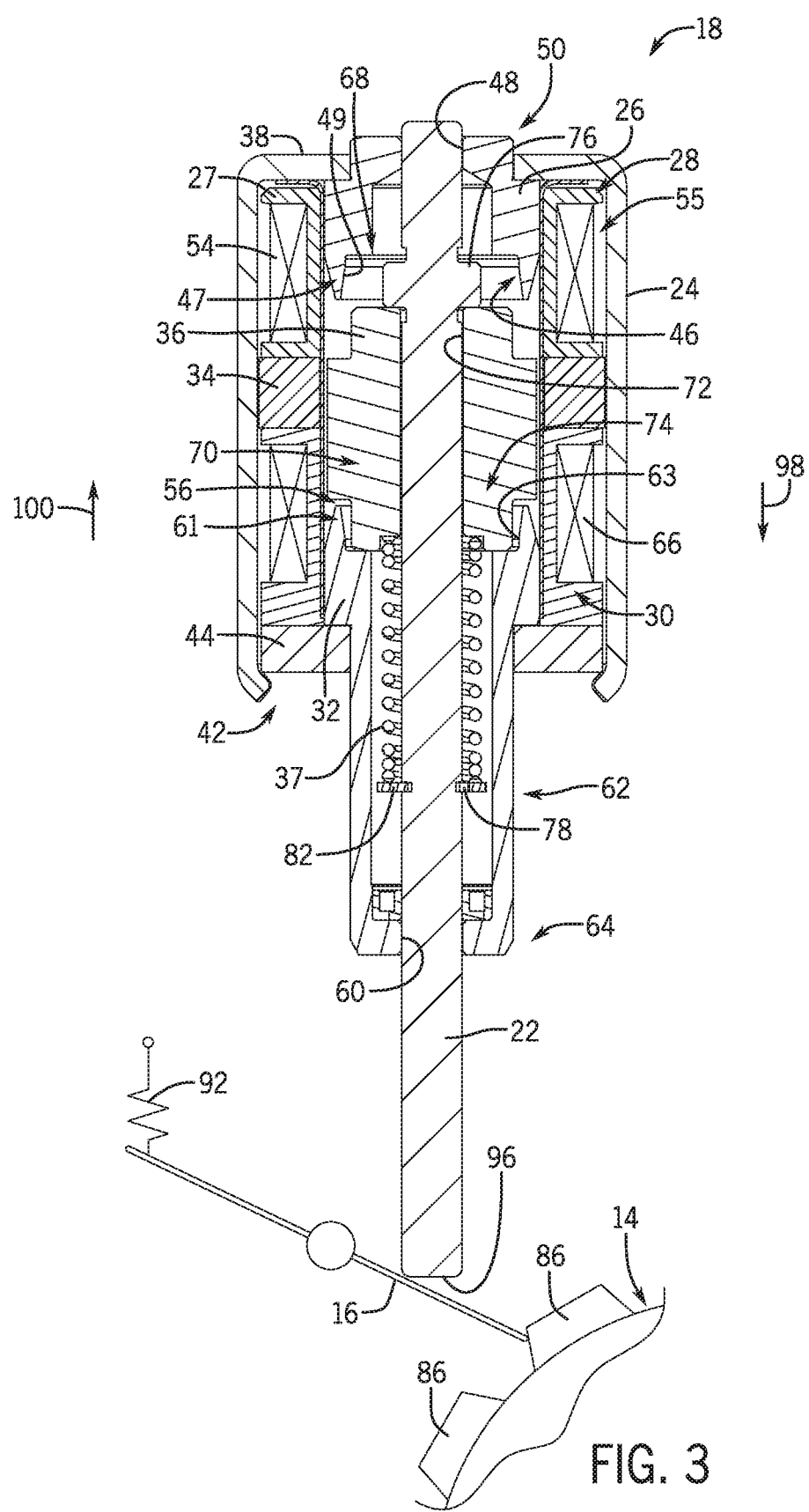
FIG. 3 is a schematic illustration of the bi-stable solenoid in a extended position and biasing a rocker toward a gear according to one aspect of the present disclosure.

In some non-limiting examples, movement of the pin 22 between the extended position and the retracted position may inhibit or allow the gear 14 to rotate in a desired direction. As shown in FIGS. 2 and 3, if it is desired to prevent rotation of the gear 14 in a desired direction, current can be selectively applied to the wire coil 55 to move the pin 22 into the extended position (see, e.g., FIG. 3). To move the pin 22 into the extended position from the retracted position, a current in the first direction may be applied to the wire coil 55 to shift the armature 36 to the second armature position. As the armature 36 moves from the first armature position to the second armature position, the spring 37 may be compressed and force the snap ring 82, and thereby the pin 22, to displace in a first axial direction 98 (e.g., downward from the perspective of FIGS. 2 and 3). The pin 22 can be allowed to displace in the first axial direction 98 until the shoulder 76 engages the armature 36.

As the pin 22 is displaced to the extended position, an actuation end 96 of the pin 22 engages the rocker arm 16 and displaces the rocker arm 16 into engagement with a portion of the gear 14. If the rocker arm 16 does not contact one of the gear teeth 86 as the pin 22 displaces to the extended position, the rocker arm 16 is displaced into contact with the gear 14 in a space between adjacent gear teeth 86. In this illustrated position of FIG. 3, the rocker arm 16 is configured to prevent the gear 14 from rotating in a given direction. For example, in the illustrated non-limiting example of FIG. 3, the gear 14 is prevented from rotating in a counter-clockwise direction.

In the illustrated non-limiting example of FIG. 1, the rocker arms 16 can be arranged such that one rocker arm 16 selectively prevents rotation of the gear 14 in the clockwise direction (e.g., the rocker arm 16 on the right) and the other rocker arm 16 prevents rotation of the gear 14 in the counter-clockwise direction (e.g., the rocker arm 16 on the left). As such, if both rocker arms 16 are actuated into the locked position, the gear 14 can be prevented rotation in both the clockwise and counter clockwise directions simultaneously.

With continued reference to FIGS. 2 and 3, if it is desired to permit rotation of the gear 14 in a desired direction, current can be selectively applied to the wire coil 55 to move the pin 22 into the retracted position (see, e.g., FIG. 2). To move the pin 22 into the retracted position from the extended position, a current in the second direction may be applied to the wire coil 55 to shift the armature 36 to the first armature position. As the armature 36 moves from the second armature position to the first armature position, the armature 36 may displace the pin 22 therewith due to the engagement between the armature 36 and the shoulder 76. That is, the pin 22 can be displaced in a second axial direction 100 (e.g., upward from the perspective of FIG. 2) until the armature 36 reaches the second armature position.

As the pin 22 is displaced to the retracted position, the actuation end 96 of the pin 22 can be displaced away from the gear 14, which allows a rocker arm spring 92 to bias the rocker arm 16 out of engagement with the gear 14 and permits the gear 14 to rotate.

Figure 4:
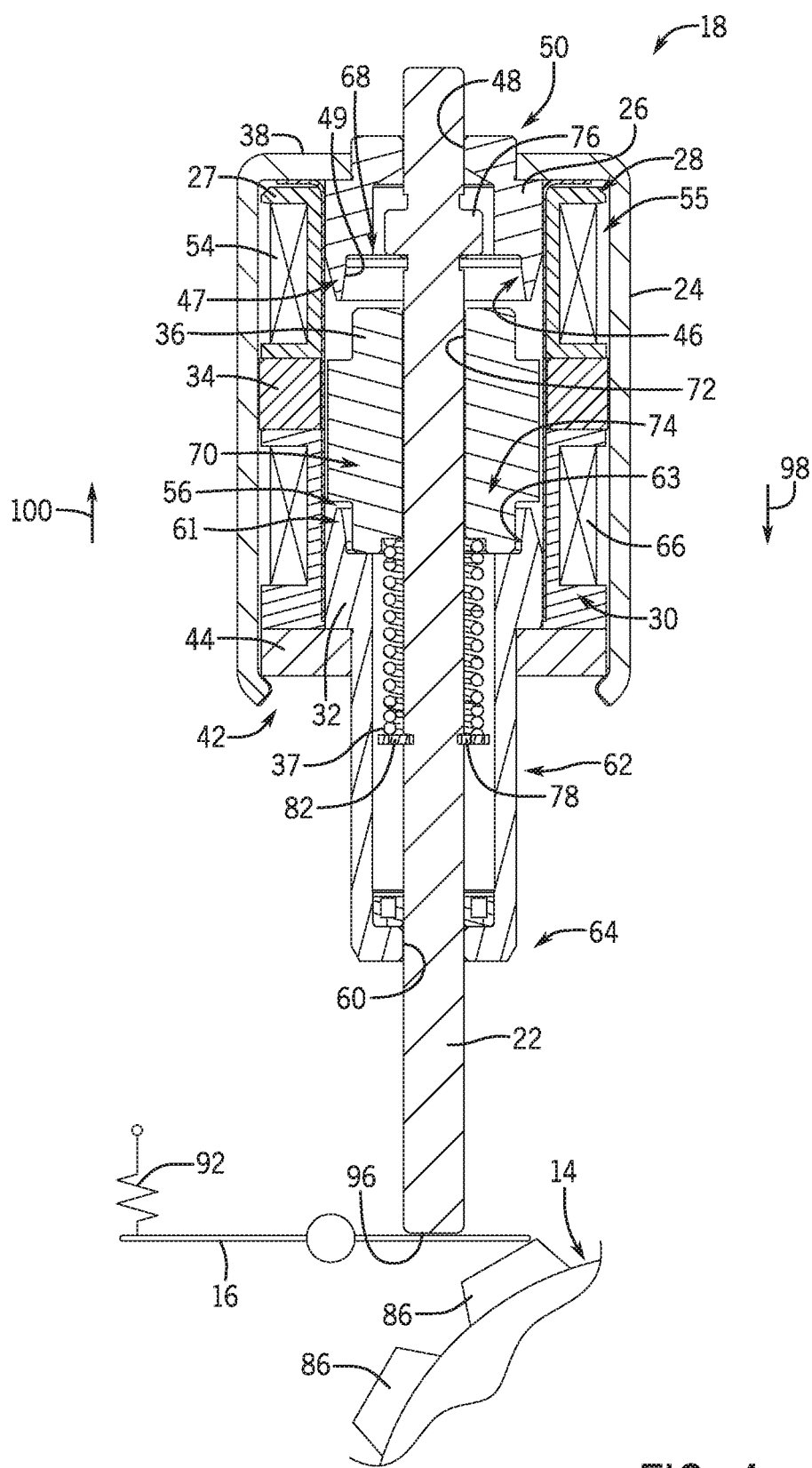
FIG. 4 is a schematic illustration of the bi-stable solenoid in an intermediate position and biasing a rocker toward a gear according to one aspect of the present disclosure.

Turning to FIG. 4, in some instances during operation, as the pin 22 is displaced from the retracted position to the extended position, the rocker arm 16 can engage a gear tooth 86 rather than fully extend into the space between adjacent gear teeth 86. When the rocker arm 16 engages a gear tooth 86, the pin 22 can be in an intermediate position, as illustrated in FIG. 4. In the intermediate position, the pin 22 is inhibited from fully displacing to the extended position; however, the design of the bi-stable solenoid and, specifically, the use of the spring 37 allow the armature 36 to fully shift to the second armature position even through the pin 22 is prevented from fully displacing to the extended position. Since the armature 36 displaces to the second armature position, the spring 37 is compressed applies a biasing force on the snap ring 82 and thereby onto the pin 22. As such, in the intermediate position, the spring 37 provides a biasing force on the pin 22 until the gear 14 rotates and the rocker arm 16 is allowed to displace into the space between adjacent gear teeth 86, which allows the pin 22 to displace to the extended position.

The use of the spring 37 within the bi-stable solenoid 18 allows the pin 22 to encounter the intermediate position and ensure that the pin 22 inevitably reaches the extended position, without requiring the wire coil 55 to be energized. This functionality can allow the armature 36 to reach the second armature position even when the pin 22 encounters the intermediate position, which maintains the bi-stable functionality of the solenoid 18 and reduces the power consumption.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A bi-stable solenoid comprising:
   a housing;
   a wire coil arranged within the housing;
   a permanent magnet arranged within the housing;
   an armature slidably arranged within the housing and moveable between a first armature position and a second armature position;
   a pin at least partially extending out of the housing and slidably engaged by the armature; and
   a spring biased between the armature and the pin,
   wherein, when the pin encounters an intermediate position between a retracted position and an extended position due to the pin engaging an obstruction, the spring is configured to maintain a biasing force on the pin until the obstruction is removed, and
   wherein the pin is slidably engaged by the armature so that when the pin is prevented from displacing to the extended position by the obstruction, the armature is allowed to fully shift from the first armature position to the second armature position.

2. The bi-stable solenoid of claim 1, wherein the bi-stable solenoid further comprises a first pole piece and a second pole piece.

3. The bi-stable solenoid of claim 2, wherein, when the armature is in the first armature position, the armature is engaged with the first pole piece and when the armature is in the second armature position, the armature is engaged with the second pole piece.

4. The bi-stable solenoid of claim 3, wherein the second pole piece includes a hollow cylindrical portion.

5. The bi-stable solenoid of claim 4, wherein the spring is disposed around the pin and at least partially within the hollow cylindrical portion of the second pole piece.

6. The bi-stable solenoid of claim 2, wherein the housing includes a first surface and an open second end.

7. The bi-stable solenoid of claim 6, wherein the first pole piece is disposed at least partially within the housing and extends at least partially through the first surface.

8. The bi-stable solenoid of claim 6, wherein the second pole piece is disposed at least partially within the open second end of the housing.

9. The bi-stable solenoid of claim 2, wherein the pin is slidably engaged by at least one of the first pole piece and the second pole piece.

10. The bi-stable solenoid of claim 9, wherein the armature is actuated between the first armature position and the second armature position by supplying a current to the wire coil in a desired direction at a predetermined magnitude.

11. The bi-stable solenoid of claim 1, wherein, when the armature is moved from the first position to the second position, the armature compresses the spring to extend the pin toward the extended position.

12. The bi-stable solenoid of claim 1, wherein, when the armature is moved from the first position to the second position and the pin is biased toward the extended position by the spring, a structure on the pin is configured to limit the axial movement of the pin.

13. The bi-stable solenoid of claim 1, wherein, when the armature is moved from the second position to the first position, the armature engages a structure on the pin to move the pin from the extended position toward the retracted position.

14. A bi-stable solenoid comprising:
    a housing;
    a wire coil arranged within the housing;
    a permanent magnet arranged within the housing;
    an armature slidably arranged within the housing and moveable between a first armature position and a second armature position;
    a pin at least partially extending out of the housing and slidably engaged by the armature, the pin being moveable between an extended position and a retracted position; and
    a spring biased between the armature and the pin,
    wherein, when the armature is moved from the first armature position to the second armature position, the spring applies a force onto the pin, thereby biasing the pin toward the extended position, and when the armature is moved from the first armature position to the second armature position and the pin encounters an obstruction, the spring continues to bias the pin toward the extended position until the obstruction is removed and the pin is allowed move to the extended position.

15. The bi-stable solenoid of claim 14, further comprising a first pole piece and a second pole piece, and when the armature is in the first armature position, the armature is engaged with the first pole piece and when the armature is in the second armature position, the armature is engaged with the second pole piece.

16. The bi-stable solenoid of claim 15, wherein the second pole piece includes a hollow cylindrical portion.

17. The bi-stable solenoid of claim 16, wherein the spring is disposed around the pin and at least partially within the hollow cylindrical portion of the second pole piece.

18. The bi-stable solenoid of claim 14, wherein the armature is actuated between the first armature position and the second armature position by supplying a current to the wire coil in a desired direction at a predetermined magnitude.

19. The bi-stable solenoid of claim 14, wherein, when the armature is moved from the first position to the second position and the pin is biased toward the extended position by the spring, a structure on the pin is configured to limit the axial movement of the pin.

20. The bi-stable solenoid of claim 14, wherein, when the armature is moved from the second position to the first position, the armature engages a structure on the pin to move the pin from the extended position toward the retracted position.

* * * * *